US006032174A

United States Patent [19]

Avsan et al.

[11] Patent Number: 6,032,174

[45] Date of Patent: Feb. 29, 2000

[54] LOAD SHARING SYSTEM AND A METHOD FOR PROCESSING OF DATA AND A COMMUNICATION SYSTEM WITH LOAD SHARING

[75] Inventors: Oleg Avsan; Klaus Wildling, both of Huddinge, Sweden

[73] Assignee: Telefonaktiebolaget LM Ericsson, Stockholm, Sweden

[21] Appl. No.: 08/817,513

[22] PCT Filed: Oct. 17, 1995

[86] PCT No.: PCT/SE95/01209

§ 371 Date: Jun. 9, 1997

§ 102(e) Date: Jun. 9, 1997

[87] PCT Pub. No.: WO96/12226

PCT Pub. Date: Apr. 25, 1996

[30] Foreign Application Priority Data

Oct. 17, 1994 [SE] Sweden .................................. 9403534

[51] Int. Cl.[7] .......................................................... G06F 9/00

[52] U.S. Cl. ............................................ 709/108; 709/105

[58] Field of Search .................................... 709/100, 102, 709/105, 108, 300, 304; 370/401; 710/264, 260

[56] References Cited

U.S. PATENT DOCUMENTS

| | | | |
|---|---|---|---|
| 3,825,902 | 7/1974 | Brown et al. . | |
| 5,463,625 | 10/1995 | Yasrebi | 370/401 |
| 5,596,579 | 1/1997 | Yasrebi | 709/304 |
| 5,668,948 | 9/1997 | Belknap et al. | 709/231 |

FOREIGN PATENT DOCUMENTS

| | | |
|---|---|---|
| 2 271 203 | 6/1994 | United Kingdom . |
| WO 85/01598 | 4/1995 | WIPO . |
| WO 96/12226 | 4/1996 | WIPO . |

*Primary Examiner*—Majid A. Banankhah
*Attorney, Agent, or Firm*—Burns, Doane, Swecker & Mathis, L.L.P.

[57] ABSTRACT

The present invention relates to a system and method respectively for processing of data comprising a central processor system comprising at least one signal processor (SPU) for processing and administrating signals and at least one executing processor (IPU) comprising a multiport process register memory (RM). The signal processor (SPU) and the executing processor (IPU) cooperate and the system further comprises a system memory (SM). At least one traffic handling program level (THL, BAL) of the system comprises at least two identical register sets in the register memory (RM) of the executing processor which comprises at least one signal input port (A), a signal output port (B) and a data access port (C). Signal data transportations between the signal processor (SPU) and the executing processor (IPU) are done by the signal processor (SPU) during execution. The execution processor (IPU) directly switches from execution of one job to another job through switching register sets.

19 Claims, 2 Drawing Sheets

SPU
JBU
SPU
adr.
IN
Intern parall.
IPU1
RM
OUT
D
Switch
1
0
X
X
X
BAL
X
X
X
A
B
C
THL
Write
prot.
actual
progr.level
Write
sequential
exec.
IPU
adr.
I
P
Un
SM

LOAD SHARING SYSTEM AND A METHOD FOR PROCESSING OF DATA AND A COMMUNICATION SYSTEM WITH LOAD SHARING

TECHNICAL FIELD

The present invention relates to a stored-program-controlled system for processing of data. Such systems comprise hardware as well as software which are divided into a number of sub-systems and function blocks assigned given functions. The invention relates to a system comprising a central processor system with at least one signal processor for processing of, and administration of signals wherein the signal processor cooperates with at least one execution processor with a multiport register memory. The system also comprises a system memory. In such systems e.g. for the cooperation between the different function blocks, signals are used and particularly in systems with a high signalling load, it is required that the signals can be handled in a fast and efficient manner in order to provide the fastest possible signal data processing.

STATE OF THE ART

It is known in data processing systems in which the requirements on speed and efficiency are high, to use so called multiport storages, for example within internal data processing, in contex-switching etc.

For example in the AXE-system (by L M Ericsson) which is based on the use of a switching system and a control system, multiport storages in the central processor of the controlled computer are used for the process registers of the program system. In this case the temporary data of the program registers are processed and it is known to use a multiport memory set per interruptable program level. Therefor a fast switching can be achieved wherein actual process register data are available without requiring a preceding resetting of preserved data.

According to this known system a signal processor and an execution processor of thus cooperating. Then the signal processor transfers an incoming signal or a job to an intermediate buffer during the program execution of a preceding job in the execution processor. When a job has been terminated or if for example a program interruption is ordered to a job having a higher priority, the next function block-initiating signal with the data is fetched by the execution processor. In case of return to an interrupted program, a direct access to the register data of the program is provided through switching to a register set belonging to the program level. When a signal is sent, the executing processor transports signal data from its register memory to an output data-intermediate buffer.

Particularly through these transportations back and forth to intermediate buffers the capacity of the data processing system is limited which in some cases may have a limiting influence, particularly if the data processing system should have a high or even very high capacity.

SUMMARY OF THE INVENTION

It is an object of the present invention to provide a system for processing of data as initially referred to which has a high total capacity. It is further an object of the invention to provide a system in which the signal load is distributed in such a way that the capacity can be increased as compared to know systems. Particularly it is an object of the invention to provide a system wherein the time required for transportations of signals can be reduced. A particular object of the invention is to provide a system which facilitates and makes the distribution of jobs to more than one executing processor more efficient. Another particular object of the invention is to provide a system in which the data length of the signals which only to a limited extent affects the traffic handling in the system as compared to known systems.

It is also an object of the invention to provide a method for data processing which fulfils the objects mentioned above in relation to the system.

It is furthermore a particular object of the invention to provide a communications system such as for example a telecommunications system or a data communication system with load sharing which has a high capacity and wherein the objects mentioned above in relation to the system can be met.

These as well as other objects are achieved through a system for processing of data which comprises a central processor system with at least one signal processor for signal processing and administration of signals comprising a cooperation buffer, and at least one execution processor with a multiport register memory wherein the signal processor and the execution processor cooperate, and a system memory wherein there are two identical register sets for at least one program level in the register memory of the execution processor and wherein the register memory comprises at least one port each for signal input and signal output respectively and further at least one data access port. The signal data transports between the signal processor and the execution processor are carried out by the signal processor and for carrying out consecutive program executions no intermediate signal data transports are required.

According to the invention the signal load is distributed between the signal processor and a function executing processor so that a high system capacity is provided. Furthermore multiport memories are used. They contain the process registers which are necessary for the data processing, particularly a register set per interruptable program level. These process registers both contain signal data and further process-data which is processed during the execution by the function block. According to a particular embodiment of the invention the distribution of the load between at least one signal processor and an execution processor is such that a traffic controlling program level for data processing is provided with two identical register sets and a signal input port, a signal output port and at least one port for data accesses. Signal data of a signal can then be input to the process register of the execution processor in advance without loading or disturbing program execution that may go on in the execution processor. When a function block addressed by an incoming signal is to be started up at end of a program, a switching is done to the second register set, i.e. the one that was not activated in the execution of the preceding job. Thus a new job can be started immediately by the execution processor and no signal data transport from an intermediate buffer is required.

According to the invention one, a plurality of, or all program levels can equipped with duplicated register sets. According to particular embodiment the system comprises more than one execution processor to which jobs are distributed. According to an advantageous embodiment of the invention transmission of data signals, for example for signal buffering to other function blocks etc. is done from the register set of those programs which are executed. Updating is then not required. Through the data access port (at least one), the process register memory of the signal processor can clear the process registers on signal data while the concerned execution processor proceeds with program execution. In this case it may be convenient to arrange a write protection for the actual process register the data of which still has not been transmitted. When the write protection is activated, the write operation of the execution processor is according to an advantageous embodiment temporarily stopped until the actual process register is cleared. According to one embodiment write operations at processing of data are directed to all register ports of the register set that belong to the actual program level. The system memory can be distributed or central.

The invention also relates to a method for processing of data which is based on a distribution of the signal load. When a program is executed by an execution processor an existing register set in the register memory of the execution processor is used. Signal data are input to the register in advance without disturbing the program execution going on in the execution processor. When a function block is addressed by a signal it is to be started at the end of e.g. the preceding program. Then a switch is done to the second register set and the new job is directly started by the execution processor without requiring any intermediate signal data transports e.g. from intermediate buffers or the similar. The transport of the signal data to the execution processor is done by the cooperation processor. Particularly the switching between execution of different jobs is done directly without any intermediate buffering of signal data. Signal data may particularly be transmitted from the register set that is used in a program being executed.

The invention also relates to a communication system, for example a telecommunications system or a data communications system which comprises a system in which the load is shared as described in the foregoing.

It is an advantage of the system according to the invention that the traffic handling influencing capacity of the control system can be increased among others through an adequate structuring of the load distribution between the signal processor or the cooperation processor and the execution processor (processors). The system is also advantageously usesd for distribution of jobs from the signal processor to number of different execution processors. Since the traffic affecting capacity of the system mainly is given by the capacity of an execution processor, the data length of the signals will affect the traffic handling to an extent that is lower than hitherto known.

BRIEF DESCRIPTION OF THE DRAWINGS

The invention will in the following be more thoroughly described in a non-limiting way under reference to the accompanying drawings wherein.

DETAILED DESCRIPTION OF THE INVENTION

Figure 1:
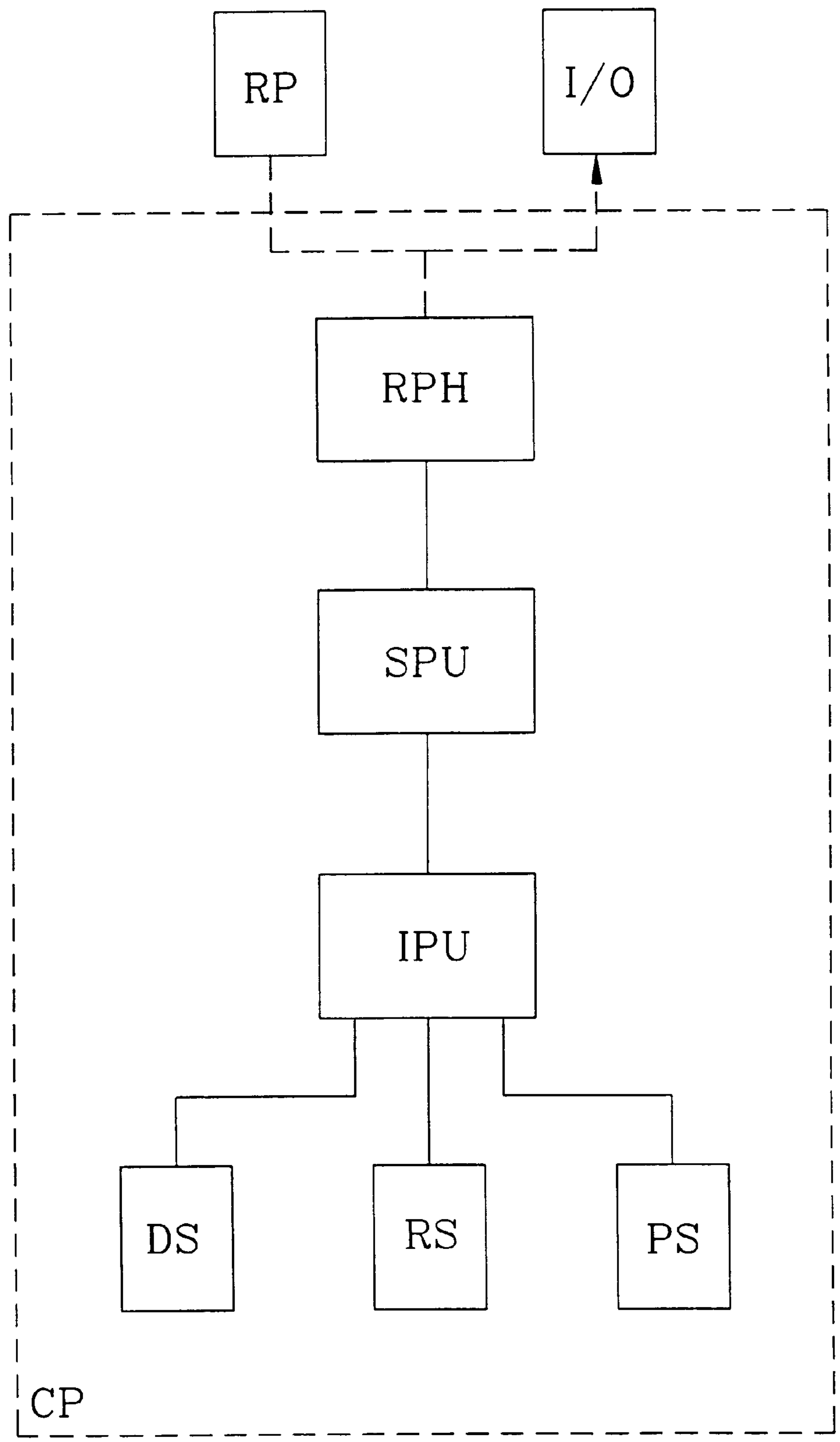
FIG. 1 shows a simplified block diagram of an example of a system comprising data in which the invention can be applied and FIG. 2 illustrates an example of a system according to the invention.

In FIG. 1 an example on a control computer system is shown which comprises a central processing system which through input/output means I/O is connected to different external or peripheral units or a regional processor system comprising one or more regional processors RP. This control computer part which comprises hardware as well as software of course comprises a number of sub-systems and function blocks of which however only a few which are relevant for the present invention will be described herein. The function blocks are usually assigned specific functions and the function blocks comprise a number of circuit boards. The regional processor handler processes signals to and from regional processors RP. According to an advantageous embodiment a regional processor handler RPH handles a plurality of regional processors. The signal processor SPU administrates signals or jobs to one or more execution processors IPU which have as their main task to execute programs. In the shown embodiment an execution processor IPU comprises three parallel memories, namely a data memory DS, reference memory RS and a program memory PS. This however merely constitutes one example and the central processor system thus not have to be built in this way. It is also possible to duplicate the central processor system in itself in order to in this way provide redundancy.

Figure 2:
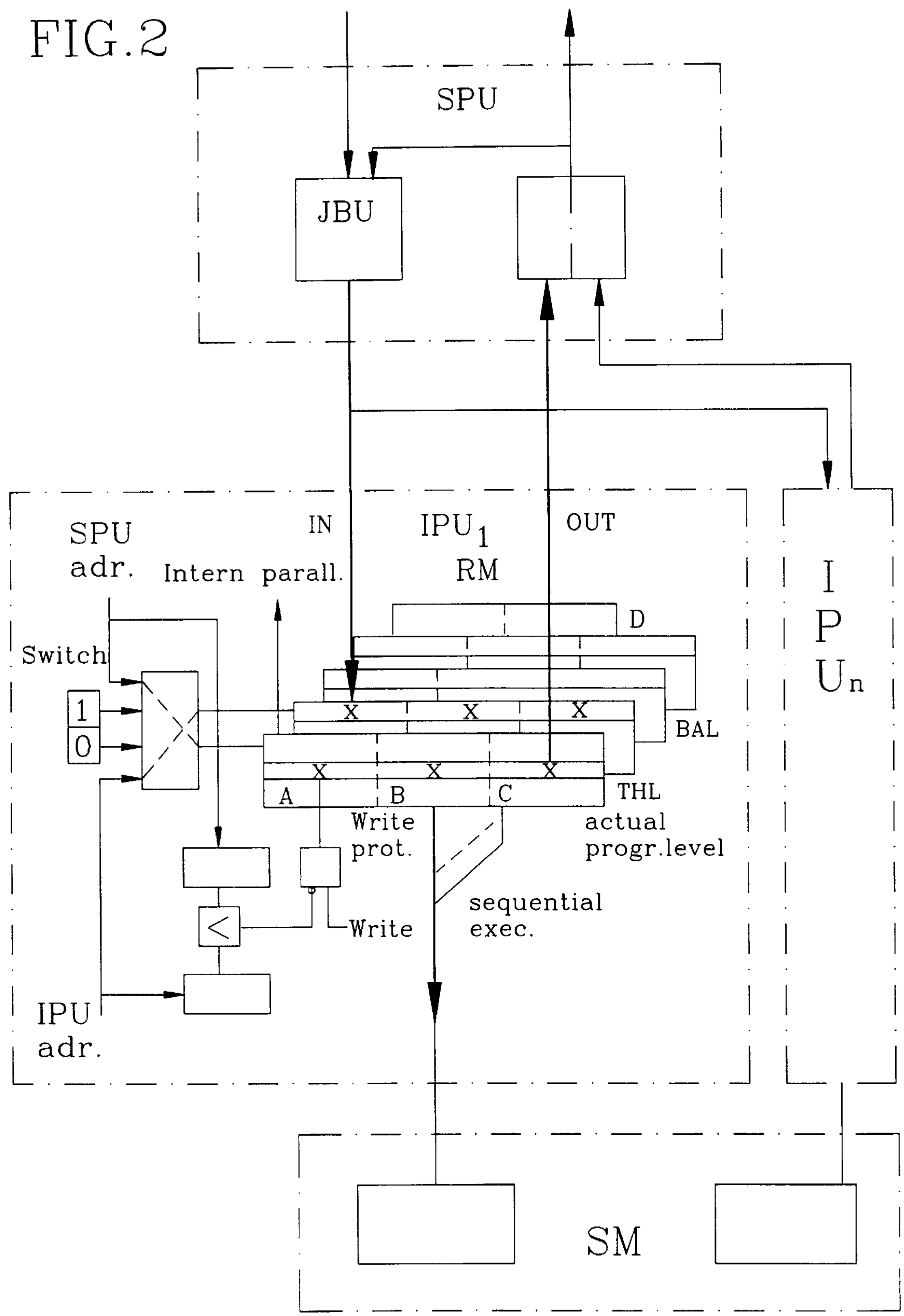

In FIG. 2 a signal processor (also denoted cooperation processor) SPU is illustrated. It comprises one or more so called job buffers JBU. Of course it also comprises other units but these are not essential for the present invention and they can e.g. be of a number of known types. A signal processor SPU cooperates with one or more execution processors $IPU_{i:i=1, \ldots, n}$ wherein n is the number of execution processors in the system. The central processor system further comprises a so called system memory SM which either is a distributed memory or a central memory. This is used for storing processed temporary data from the process registers RM in the execution processor (processors) $IPU_i$. For processing of data, stored data is read into the register memory RM. The process registers RM in the execution processor(s) IPU contain signal data and other process data that is processed during the execution by the respective function block. The register memories RM contain the process registers which are necessary for the data processing, advantageously one register set per program level. These register memories RM comprise a number of ports A,B,C. According to the shown embodiment a data processing traffic controlling program level THL, BAL (Traffic Handling Level, Base Level) is given two identical register sets with one port for signal input A, one port for signal output B and at least one port for data accesses C. During the execution of a job a signal with signal data is input to the register memory RM of an execution processor $IPU_i$, in advance, independently of whether the execution processor IPU executes a program or not, without loading or disturbing this execution. When the program execution is to be terminated, a signal addresses a function block to start up. Then a switch is done to the second register set and the new job can be initiated directly by the execution processor $IPU_i$, without requiring any transport of signal data from any intermediate buffer or similar. The transport, which is done in advance and the input of signal data to the register set which does not contain the job that is executed by the execution processor, is done by the cooperation or signal processor SPU. According to an advantageous embodiment all program levels are equipped with the double register sets. There can of course be more than two (as shown i FIG. 2), for example THL, BAL, D (not shown) or even more. Of course there may also be fewer. Alternatively are only some levels provided with duplicated register sets. In the shown embodiment the program level D is not equipped with duplicated register sets even if also it could be so for this level. A number of different alternatives are possible, one level may have duplicated register sets but only two ports etc. Furthermore triplicated or multiple register sets can be used. The job that is executed uses one register set while the other register set is used for receiving start data for the next job.

The execution processor is generally register oriented which means that all data that is to be processed is stored as temporary data in registers in the register memory RM. According to different alternatives one or more execution processors IPU may cooperate with a job distributing signal processor SPU. In the shown embodiment three port memories with duplicated register sets are used for traffic controlling program levels THL, BAL (with a high signalling load) which are not interruptable between themselves. According to the invention may furthermore program levels D be equipped with a single register set with two ports for jobs having a low priority and a low frequency. For such program levels the capacity is not increased neither as far as buffering of the next job or transmission of signals is concerned, which however is not necessary in these cases.

For example one of the ports A can be used for internal activities within the execution processor $IPU_1$. One example thereof may be data prebuffering or similar, i.e. it can internally be used in parallel as data output.

Since duplicated register sets are used for the program levels THL, BAL for job input, the different registers can be addressed in an alternating way by the signal processor SPU. Since interruption of a job in some cases may take place it is convenient to save the address. According to different embodiments may thus either all program levels be equipped with multiple register sets or only those for which it for different reasons has been found to be adequate, particularly traffic controlling program levels THL, BAL etc. wherein the signalling intensity is high. When data signals are transmitted for example to other function blocks, this is done from the register set which is operative during execution of a program in progress in order to avoid the need of providing updating. With the use of the third port C in the register memory RM, the data access port, it is possible for the signal processor SPU to clear the process registers of the register memory RM on signal data during an on-going program execution by the execution processor IPU. In this case however a write protection should be arranged for the actual process register, the data of which are not yet transmitted. If this write protection is activated, the write operation of the execution processor IPU is temporarily stopped until the actual process register is cleared. At data processing, write operations are directed to all register ports of the register set which belonging to the program level. The write protection for process register data that has not yet been transmitted may according to one embodiment be arranged by comparing actual register address for transmitted data with the register address which is intended for the write data of the execution processor IPU. Signal data clearing from the signal processor SPU is advantageously done sequentially for consecutive register addresses.

The system according to the invention may for example be used within data communication, telecommunication, ISDN (Integrated Services Digital Network) communication etc. Also in other aspects the invention is of course not limited to the shown embodiments but can be varied in a number of ways within the scope of the claims.

We claim:

1. System for processing of data comprising a central processor system comprising at least one signal processor (SPU) for processing and administration of signals which comprises a cooperation buffer (JBU), wherein the signal processor (SPU) cooperates with at least one execution processor ($IPU_{i:i=1, \ldots n}$) comprising a multiport register memory (RM) wherein the system further comprises a system memory (SM), characterized in, that at least one program level (THL, BAL) comprises at least two identical register sets in the register memory (RM) which comprises at least one signal input port (A), a signal output port (B) and a data access port (C) wherein signal data transports between the signal processor (SPU) and the execution processor(s) ($IPU_i$) are carried out by the signal processor (SPU) wherein signal data is transferred to the memory (RM) of the execution processor ($IPU_i$) during execution by the execution processor ($IPU_i$) and in that when switching from a job using data from a first register set to another job using data from another register set, the register sets are switched so that consecutive program executions by the execution processor ($IPU_i$) can be done directly without any intermediate signal data transports.

2. System according to claim 1, characterized in, that each program level (THL, BAL) has two identical register sets.

3. System according to claim 1, characterized in, that the register memory (RM) in the execution processor ($IPU_i$) contains signal data and process data.

4. System according to claim 1, characterized in, that the process register memory (RM) comprises at least two ports for data accesses.

5. System according to claim 1, characterized in, that signals comprising signal data in advance are introduced into the process register memory (RM) via the signal input port (A) during a program execution in the execution processor ($IPU_i$).

6. System according to claim 5, characterized in, that when a function block addressed by a signal is to be started up, a switch is done to a register set which was passive during the preceding job.

7. System according to claim 1, characterized in, that switching from the execution of one job to another job is done directly without any intermediate buffering of signal data.

8. System according to claim 1, characterized in, that signal data are transmitted from the register set that is used during execution of a program.

9. System according to claim 1, characterized in, that the register set which is not used in an execution is used for signal data transmissions and in that an updating function provides for updating of data.

10. System according to claim 1, characterized in, that it comprises at least two execution processors ($IPU_i$).

11. System according to claim 1, characterized in, that the system memory (SM) is a central memory.

12. System according to claim 1, characterized in, that the system memory (SM) is a distributed memory.

13. System according to claim 1, characterized in, that the data access port (C) is used for clearing signal data from the process registers of the process register memory (RM).

14. System according to claim 13, characterized in, that during clearing of the process registers of the process register memory (RM) the execution processor ($IPU_i$) is executing.

15. System according to claim 13, characterized in, that it comprises an arrangement for protection of non-transmitted data in the process register memory (RM) during clearing.

16. System according to claim 1, characterized in, that write operations are directed at least towards each of a signal input port (A), a signal output port (B) and a data access port (C) of the register set belonging to the program level.

17. System according to claim 1, characterized in, that the signal input port (A) is multiple utilized as data access or data output of the register that is not used in an on-going execution, for internal program execution.

18. Method for processing of data using load sharing in a system which comprises a central processor system comprising at least one signal processor (SPU) and at least one execution processor ($IPU_{i:i=1, \ldots n}$) comprising a multiport processor register memory (RM), characterized in, that at least one program level (THL, BAL) of the system is provided with at least two identical register sets in the register memory (RM) which is provided with at least one of each of a signal input port (A), a signal output port (B) and an access data port (C), that the signal processor (SPU) provides for signal data transports between the signal processor (SPU) and at least one execution processor (IPU), that during execution by an execution processor ($IPU_i$) using one register set, the signal processor (SPU) transports signal data for a subsequent execution to another register set, and in that the execution processor (IPU) directly switches from execution of a job to a execution of the subsequent job through switching the register sets and in that no signal data transports are required for the switching.

19. Communication system for processing of data comprising a central processor system comprising at least one signal processor (SPU) for processing an administration of signals which comprises a cooperation buffer (JBU), wherein the signal processor (SPU) cooperates with at least one execution processor ($IPU_{i=:1, \ldots n}$) comprising a multiport register memory (RM), wherein the system further comprises a system memory (SM), characterized in, that at least one traffic controlling program level (THL, BAL) contains at least two identical register sets in the register memory (RM) which comprises at least one signal input port (A), a signal output port (B) and an access data port (C) wherein signal data transports between the signal processor (SPU) and the execution processor ($IPU_i$) are provided by the signal processor (SPU) wherein signal data is transferred to the register memory (RM) of the execution processor ($IPU_i$) during execution and in that a switch from a job using data from a register set to a consecutive job using data from another register set is done directly without any intermediate signal data transports through switching register sets.

* * * * *